(12) United States Patent
Wu

(10) Patent No.: US 9,228,647 B2
(45) Date of Patent: Jan. 5, 2016

(54) ACTUATOR WITH QUICK-RELEASE MECHANISM

(71) Applicant: TIMOTION TECHNOLOGY CO., LTD., New Taipei (TW)

(72) Inventor: Chou-Hsin Wu, New Taipei (TW)

(73) Assignee: TIMOTION TECHNOLOGY CO., LTD., New Taipei (TW)

( * ) Notice: Subject to any disclaimer, the term of this patent is extended or adjusted under 35 U.S.C. 154(b) by 342 days.

(21) Appl. No.: 13/895,000

(22) Filed: May 15, 2013

(65) Prior Publication Data

US 2014/0260730 A1    Sep. 18, 2014

(30) Foreign Application Priority Data

Mar. 13, 2013 (TW) .............................. 102108839 A

(51) Int. Cl.
*F16H 25/20*    (2006.01)
(52) U.S. Cl.
CPC .......... *F16H 25/20* (2013.01); *F16H 2025/209* (2013.01); *F16H 2025/2031* (2013.01); *F16H 2025/2071* (2013.01); *F16H 2025/2084* (2013.01); *Y10T 74/18576* (2015.01)
(58) Field of Classification Search
USPC ........................................................ 74/89.38
See application file for complete search history.

(56) References Cited

U.S. PATENT DOCUMENTS

| 5,329,657 | A * | 7/1994 | Bartley et al. ...................... 5/617 |
| 7,594,450 | B2 * | 9/2009 | Wu et al. ....................... 74/89.38 |
| 7,935,901 | B2 * | 5/2011 | Sorensen et al. ............. 200/17 R |
| 8,024,987 | B2 * | 9/2011 | Yamaguchi et al. .......... 74/89.23 |
| 2008/0134815 | A1 * | 6/2008 | Larsen et al. ................. 74/89.34 |
| 2008/0210029 | A1 * | 9/2008 | Wang ............................ 74/89.38 |
| 2009/0120220 | A1 * | 5/2009 | Sorensen et al. ............. 74/89.38 |

FOREIGN PATENT DOCUMENTS

| CN | 101040134 A | 9/2007 |
| CN | 100552263 C | 10/2009 |
| DE | 202006009957 U1 | 12/2006 |
| DE | 202007001797 U1 | 5/2007 |

(Continued)

OTHER PUBLICATIONS

German Office Action issued on Jan. 27, 2014.

(Continued)

*Primary Examiner* — David M Fenstermacher
(74) *Attorney, Agent, or Firm* — Chun-Ming Shih; HDLS IPR Services

(57) ABSTRACT

An actuator with a quick-release mechanism includes a base (10); an electric motor (20) including a worm shaft (212); a transmission mechanism (30) including a worm gear assembly (31), a lead screw shaft (32) and a bearing (33); a quick-release mechanism (40) including first and second cylinders (41, 42) attached to the lead screw shaft (32); an elastic member (50) clamped between the worm gear assembly (31) and the second cylinder (42) and a dialing mechanism (60) including a rotating piece (62) pivotally attached to the base (10); and wherein the worm gear assembly (31) including protruding teeth (316); the second cylinder (42) includes teeth slots (424) engaged with the protruding teeth (316) for engaged or disengaged transmission; and the rotating piece (62) includes a dial arm (621) to push the second cylinder (42) to disengage from the worm gear assembly (31) for torque transmission.

20 Claims, 8 Drawing Sheets

(56) References Cited

FOREIGN PATENT DOCUMENTS

| TW | M456639 U1 | 7/2013 |
| WO | WO2006/039931 A1 | 4/2006 |

OTHER PUBLICATIONS

Office Action dated Jul. 14, 2015 of the corresponding Taiwan patent application.

* cited by examiner

ACTUATOR WITH QUICK-RELEASE MECHANISM

BACKGROUND OF THE INVENTION

1. Field of the Invention

The present invention relates to an actuator, in particular, to an actuator with a quick-release mechanism.

2. Description of Related Art

Linear actuators are commonly used in applications such as electric medical beds, treadmills and wheelchairs for adjusting and shifting the elevation positions and elevation angles thereof. For emergency purposes of patient treatments, the use of actuator with a quick-release mechanism allows the medical bed to be adjusted and shifted rapidly such that precious time crucial in medical emergencies can be saved, which is an important objective of the present invention.

A known actuator with a quick-release mechanism is disclosed in such as Chinese Patent Publication No. CN100552263C comprising an electric motor, a transmission mechanism and a quick-release mechanism. The electric motor comprises a main body and a worm shaft extended outward from a center of the main body. The transmission mechanism comprises a lead screw shaft and a worm gear mounted on one end of the lead screw shaft and engaged for transmission with the worm shaft. The quick-release mechanism comprises two cylindrical connection parts; wherein one cylindrical connection part is firmly attached to the lead screw shaft to rotate together with the lead screw shaft and another cylindrical connection part is firmly attached to the worm gear to rotate together with the worm gear. The corresponding end of each one of the cylindrical connection parts is provided with a torque transmission unit. By utilizing the engagement and disengagement between the cylindrical connection parts, the lead screw shaft and the worm gear can be either engaged with each other for transmission or disengaged from each other for transmission.

Nevertheless, the known actuator with a quick-release mechanism shows the following drawbacks during its actual operation and use. Such known actuator is of a complicated structure involving a great number of components, which poses difficulties to the assembly thereof and requires greater costs in the material and manufacturing the components as well as the overall production costs of the actuator. Furthermore, the method of push used to actuate the engagement and disengagement of the cylindrical connection parts tends to generate a relatively small reaction force, which leads to inconvenience to the use and operation of the actuator.

SUMMARY OF THE INVENTION

An objective of the present invention is to provide an actuator with a quick-release mechanism which is of an overall structure of a simplified design such that the assembly process and operation thereof can be made convenient and facilitated.

To achieve the aforementioned objective, the present invention provides an actuator with a quick-release mechanism comprising a base, an electric motor, a transmission mechanism, a quick-release mechanism, an elastic member and a dialing mechanism. The electric motor is attached to the base and comprises a worm shaft. The transmission mechanism is attached to the base and comprises a worm gear assembly, a lead screw shaft and a bearing. The worm gear assembly is driven by the worm shaft and is formed with a plurality of protruding teeth, and the lead screw shaft penetrates through the worm gear assembly and is supported on the base via the bearing. The quick-release mechanism is mounted onto the lead screw shaft and is formed on a lateral side of the worm gear assembly and comprises a first cylinder fixedly attached to the lead screw shaft and an axially moveable second cylinder is attached to the first cylinder. The second cylinder comprises a plurality of teeth slots to engage with each one of the plurality of teeth for any one of an engaged transmission and a disengaged transmission thereof. The elastic member is elastically clamped between the worm gear assembly and the second cylinder. The dialing mechanism comprises a rotating piece pivotally attached to the base. The rotating piece comprises a dial arm for pushing away the second cylinder to disengage from transmitting a torque of the worm gear assembly.

To achieve the aforementioned objective, the present invention further provides an actuator with a quick-release mechanism comprising a base, an electric motor, a transmission mechanism, a quick-release mechanism, an elastic member and a dialing mechanism. The electric motor is attached to the base and comprises a worm shaft. The transmission mechanism is attached to the base and comprises a worm gear assembly, a lead screw shaft and a bearing. The worm gear assembly comprises a worm gear driven by the worm shaft and an axial sleeve attached to the worm gear to be rotated therewith. The axial sleeve is formed with a plurality of protruding teeth, and the lead screw shaft penetrates through the worm gear assembly and is supported on the base via the bearing. The quick-release mechanism is mounted onto the lead screw shaft and is formed on a lateral side of the worm gear assembly and comprises a first cylinder fixedly attached to the lead screw shaft and an axially moveable second cylinder attached to the first cylinder. The second cylinder comprises a plurality of teeth slots to engage with each one of the plurality of teeth for any one of an engaged transmission and a disengaged transmission thereof. The elastic member is elastically clamped between the worm gear and the second cylinder. The dialing mechanism comprises a rotating piece pivotally attached to the base. The rotating piece comprises a dial arm for pushing away the second cylinder to disengage from transmitting a torque of the axial sleeve.

The present invention is of the following merits and technical effects. During the release process of the second cylinder and the worm gear assembly, since the worm gear assembly is not subject to any lateral pushing forces exerted by the rotating piece, the worm gear assembly is free from shifting of positions such that a stable transmission between the worm gear and the worm shaft can be ensured. By locking the pulling rod onto the rotating piece, the arc swing movement is translated into a linear motion, which greatly reduces the required pulling force to be exerted by the user.

DETAILED DESCRIPTION OF THE INVENTION

Figure 1:
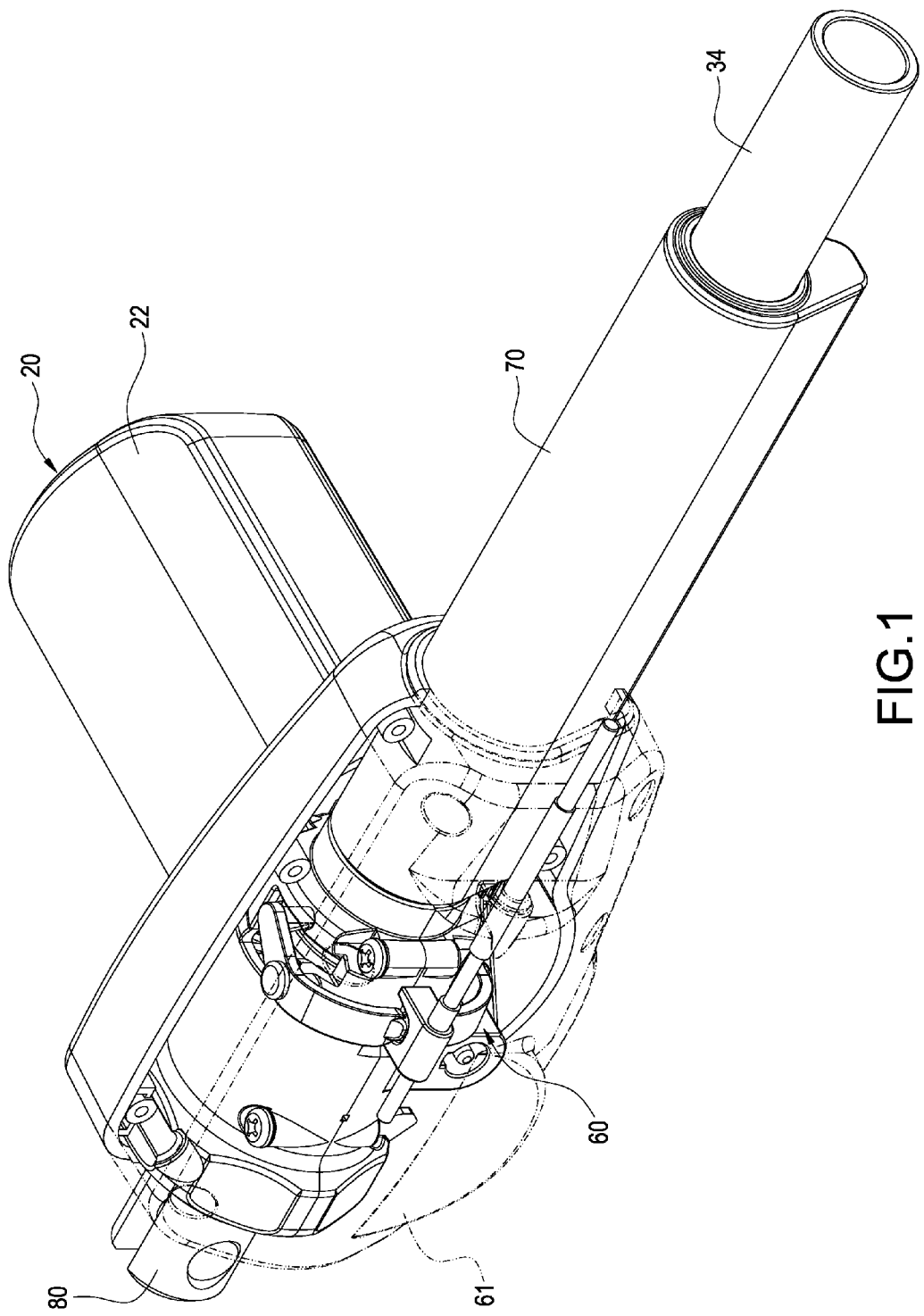
FIG. 1 is a perspective view of an actuator of the present invention.
Figure 2:
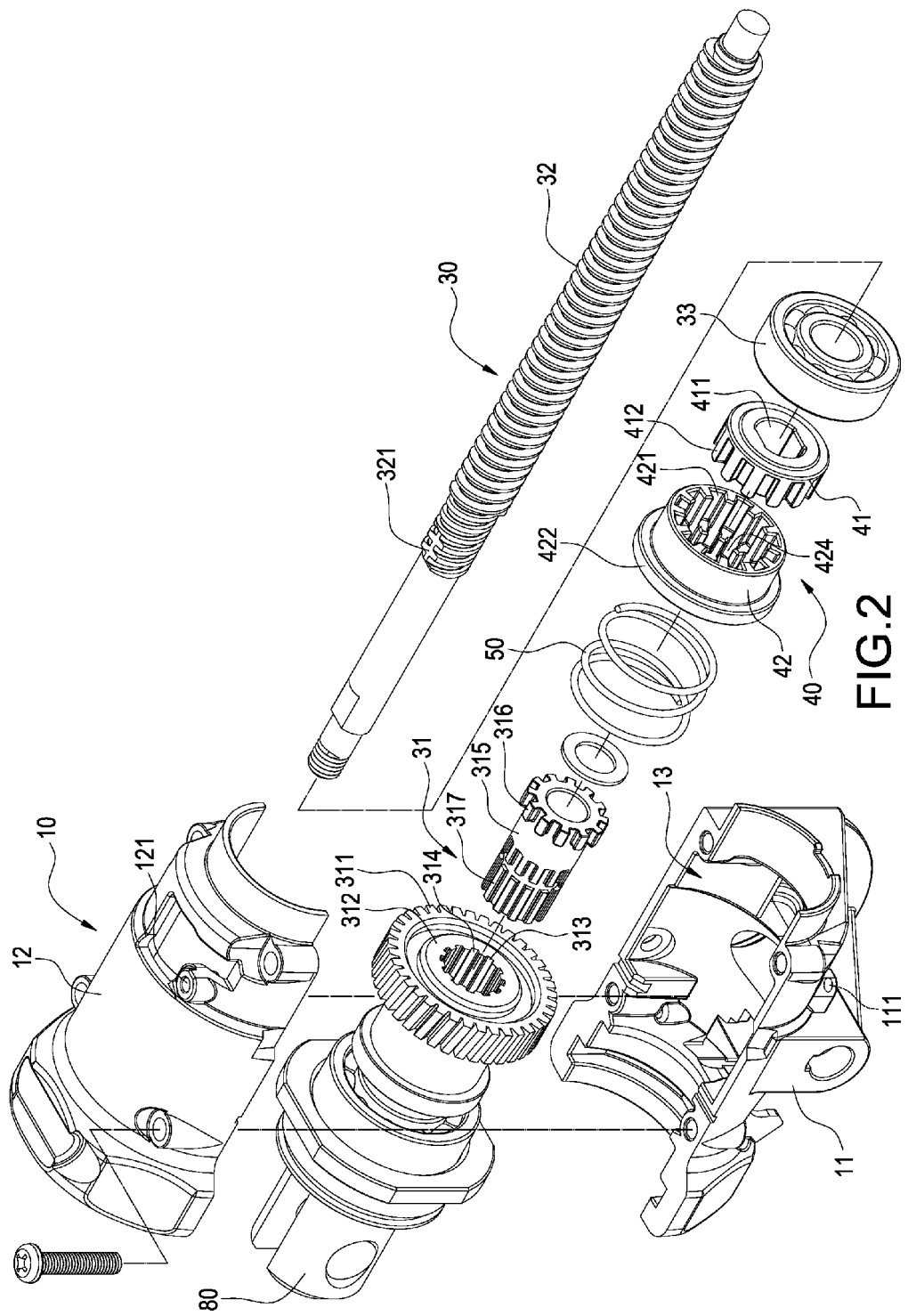
FIG. 2 is an exploded view of the base, the transmission mechanism and the quick-release mechanism of the present invention.
Figure 3:
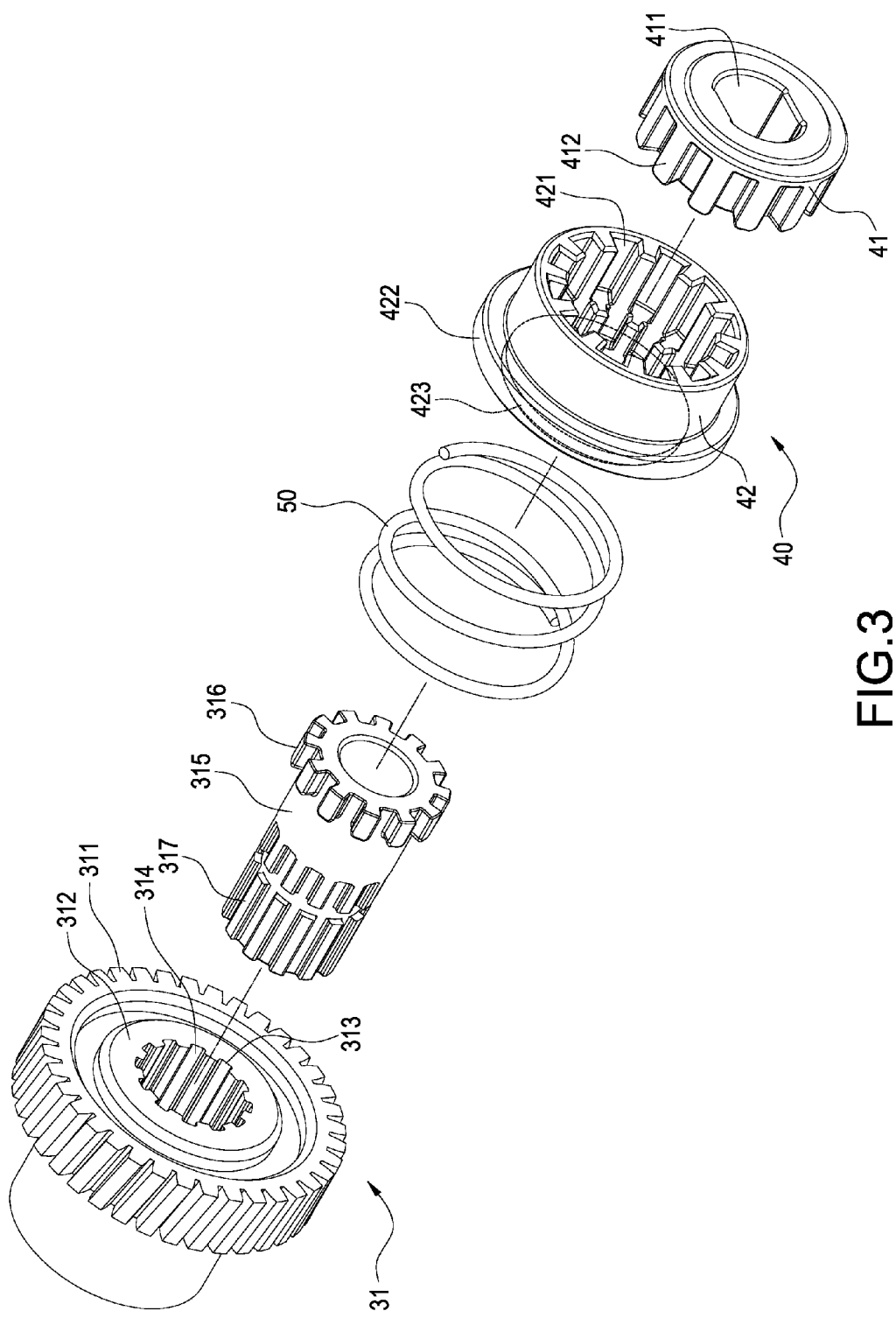
FIG. 3 is an exploded view of the worm gear assembly, the elastic member and the quick-release mechanism of the present invention.
Figure 4:
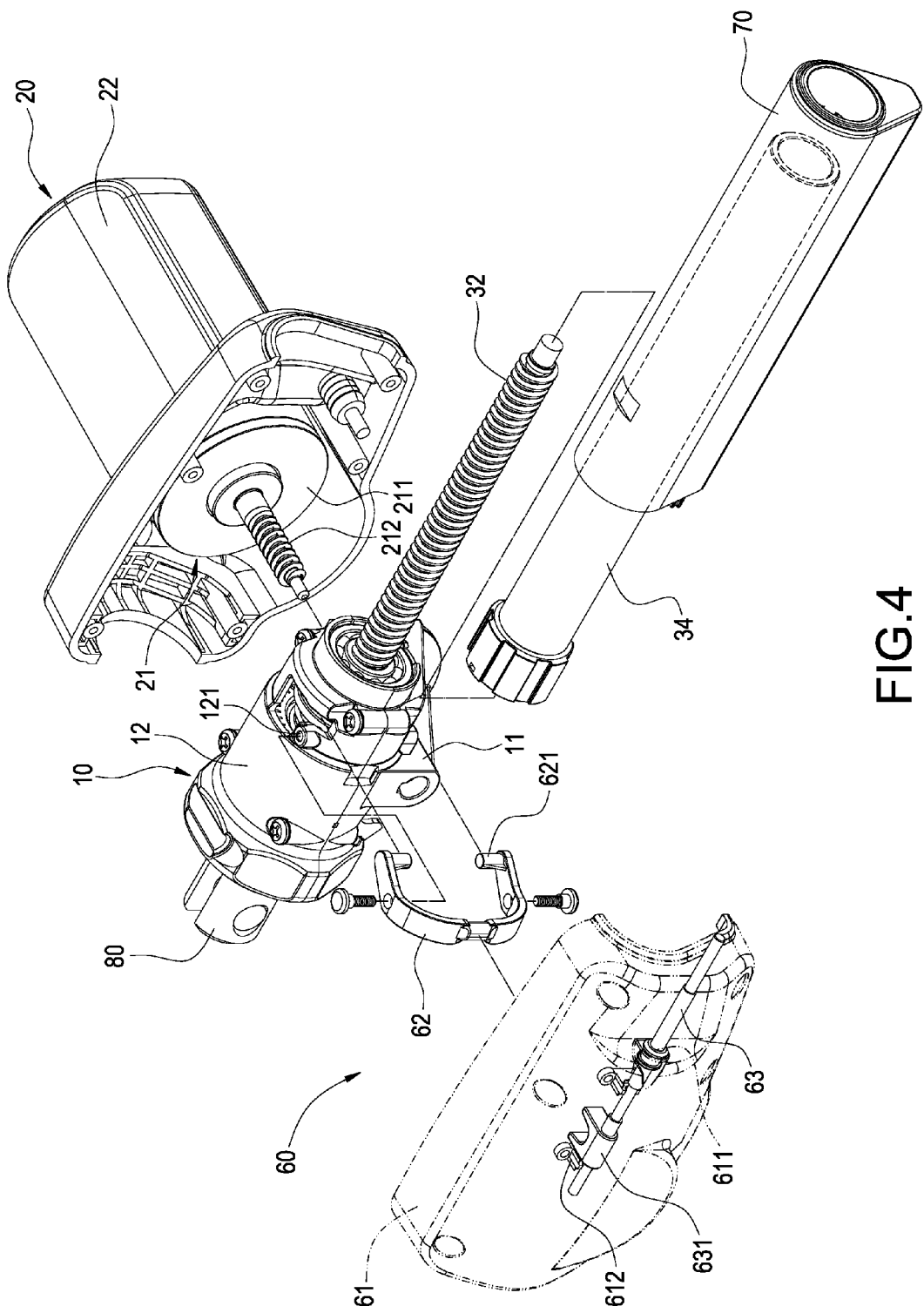
FIG. 4 is an exploded view of the actuator of the present invention.

The following provides a detailed description of the technical features of the present invention along with the accompanied drawings. It can however be understood that the accompanied drawings are provided for illustrative purposes only and shall not be used as a limitation to the present invention.

Please refer to FIG. 1 to FIG. 5. As shown in the figures, the present invention provides an actuator with a quick-release mechanism comprising a base 10, an electric motor 20, a transmission mechanism 30, a quick-release mechanism 40, an elastic member 50 and a dialing mechanism 60.

The base 10 comprises a lower base part 11 and an upper base part 12 closed correspondingly onto the lower base part 11. A chamber 13 is formed between the upper base part 12 and the lower base part 11. In addition, the upper base part 12 and the lower base part 11 are fastened with each other via fastening means such as screws. The lower base part 11 and the upper base part 12 comprise a pair of corresponding screw studs 111, 121 formed on an external thereof.

The electric motor 20 comprises a main body 21 and an electric motor housing 22 for receiving the main body 21 therein. The main body 21 comprises an electric unit 211 and a worm shaft 212 extended outward from a center of the electric unit 211. The worm shaft 212 penetrates into the internal of the chamber 13 of the base 10 when the electric motor housing 22 abuts the base 10.

Figure 5:
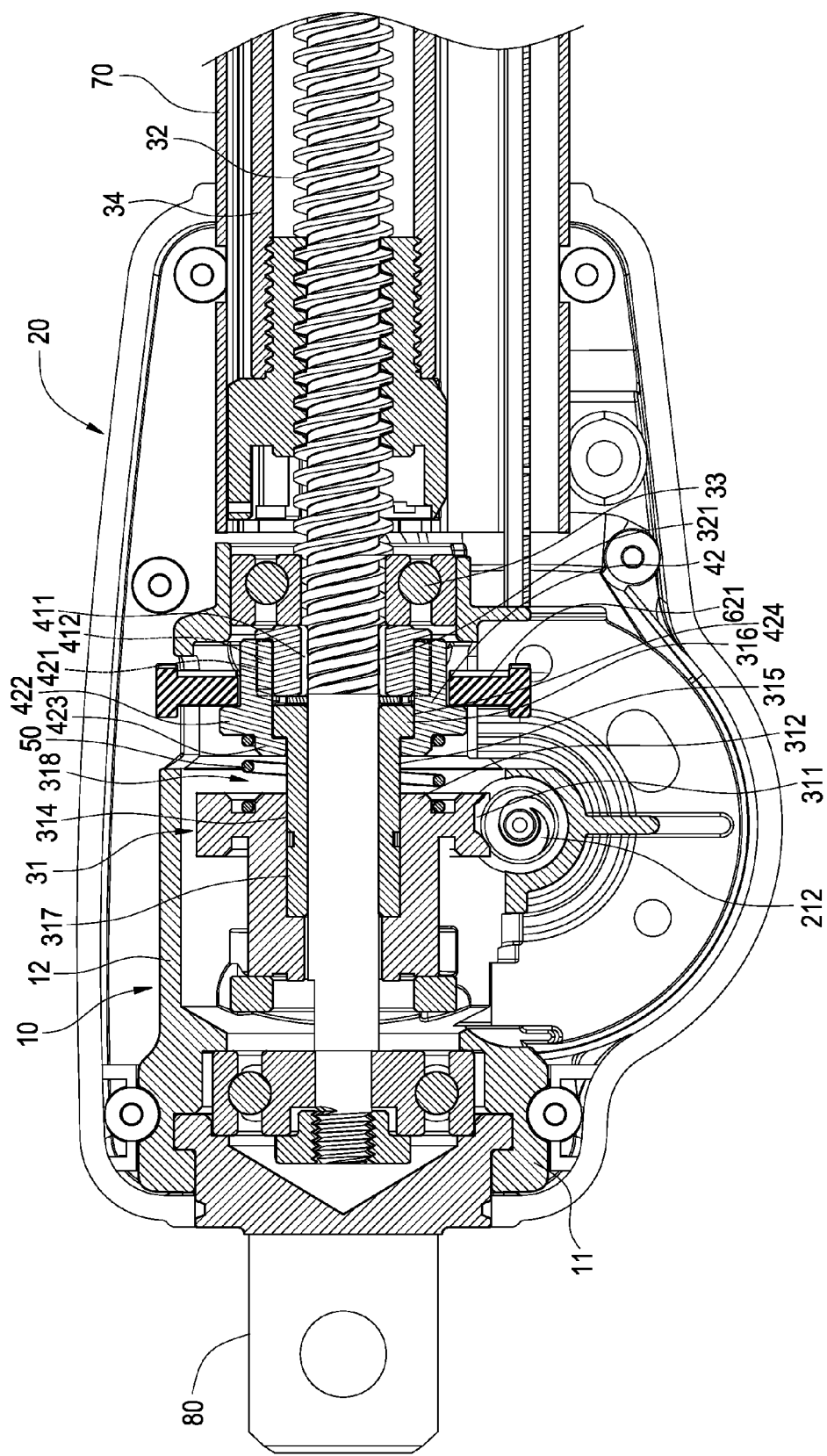
FIG. 5 is a cross sectional view of the actuator of the present invention.

The transmission mechanism 30 comprises a worm gear assembly 31, a lead screw shaft 32 and a bearing 33. The worm gear assembly 31 comprises a worm gear 311 and an axial sleeve 315; wherein the axial sleeve 315 and the worm gear 311 can be integrally formed as the aforementioned worm gear assembly 31 (not shown in the figures). The worm gear 311 and the axial sleeve 315 in this embodiment are individually manufactured prior to their attachment with each other to form the assembly. The worm gear 311 is driven by the worm shaft 212 and the axial sleeve 315 is attached to the worm gear 311 to be rotated therewith. The worm gear 311 comprises a circular supporting portion 312 extended outward from an end surface facing toward the quick-release mechanism 40. In addition, the supporting portion 312 further comprises a through hole 313 at a center thereof, and an inner wall of the through hole 313 comprises a plurality of grooves 314 arranged circumferentially thereon. The axial sleeve 315 comprises a plurality of protruding teeth 316 on an end portion away from the worm gear 311 and arranged circumferentially thereon, and the axial sleeve 315 comprises a plurality of protrusion strips 317 arranged circumferentially on an end portion adjacent to the worm gear 311. Each one of the protrusion strips 317 of the axial sleeve 315 sleeves onto and is fixedly engaged with each one of the grooves 314 of the through holes 313 of the worm gear 311, and a separation space 318 (as shown in FIG. 5) is formed between the supporting portion 312 and the protruding teeth 316. The bearing 33 is received fixedly within the internal of the chamber 13 of the base 10. One end of the lead screw shaft 32 penetrates the axial sleeve 312 and is supported on the base 10 via the bearing 33. The lead screw shaft 32 comprises a positioning section 321. Furthermore, the transmission mechanism 30 further comprises an extendable pipe 34 to be engaged with and driven by the lead screw shaft 32, and the lead screw shaft 32 is a non-self-locking lead screw shaft.

The quick-release mechanism 40 is mounted onto the lead screw shaft 32 and is formed on a lateral side of the worm gear 311 of the worm gear assembly 31 and comprises a first cylinder 41 and a second cylinder 42. The first cylinder 41 comprises a positioning hole 411, and the first cylinder 41 is fixedly mounted onto the positioning section 321 of the lead screw shaft 32 via the positioning hole 411 in order to rotate altogether. The first cylinder 41 comprises a plurality of rotation-stop teeth 412 formed on a circumferential surface thereof and spaced apart from each other. The second cylinder 42 is attached to the first cylinder 41 and the second cylinder 42 comprises a plurality of slots 421 formed thereon to be engaged correspondingly with the plurality of rotation-stop teeth 412 such that the second cylinder 42 is able to move axially relative to the first cylinder 41. The second cylinder 42 comprises a blocking ring 422 formed on an end portion away from the first cylinder 41. In addition, the second cylinder 42 comprises a protruding ring 423 extended from an end surface on the side of the blocking ring 422. Furthermore, the second cylinder 42 comprises a plurality of teeth slots 424 on an inner wall on the side of the blocking ring 22 provided for each one of the protruding teeth 316 to be selectively engaged therewith.

In this embodiment, the elastic member 50 is a torsion compression spring having two ends mounted onto the aforementioned protruding ring 423 and the supporting portion 313 and is also elastically clamped between the worm gear 311 and the second cylinder 42.

The dialing mechanism 60 comprises a cover 61, a rotating piece 62 and a pulling rod 63. The cover 61 closes onto the aforementioned electric motor housing 22 and covers the base 10. The rotating piece 62 is of a U shape and the rotating piece 62 is pivotally attached to each one of the screw studs 111, 121 via fastening means such as screw bolts. An opening end of the rotating piece comprises a pair of dial arms 621 extended inward, and the pair of dial arms 621 is arranged correspondingly to the blocking ring 422 of the second cylinder 42. The cover 62 comprises an axial hole 611, and the pulling rod 63 penetrates through the axial hole 611 and is supported on the cover 61 via two bearing seats 612. The pulling rod 63 arranged between the two bearing seats 612 is attached to a hook portion 631, and the hook portion 631 is attached to a closed end of the rotating piece 62 correspondingly.

The actuator of the present invention further comprises an external pipe 70 and a rear support 80. The external pipe 70 is mounted onto the outer circumference of the extendable pipe 34 and is secured onto an end portion of the electric motor housing 22 and the cover 61 with one end thereof. The rear support 80 is secured onto the base 10 away from an end of the external pipe 70 and comprises a partial area that is exposed and extended outward from another end portion of the electric motor housing 22 and the cover 61.

Figure 6:
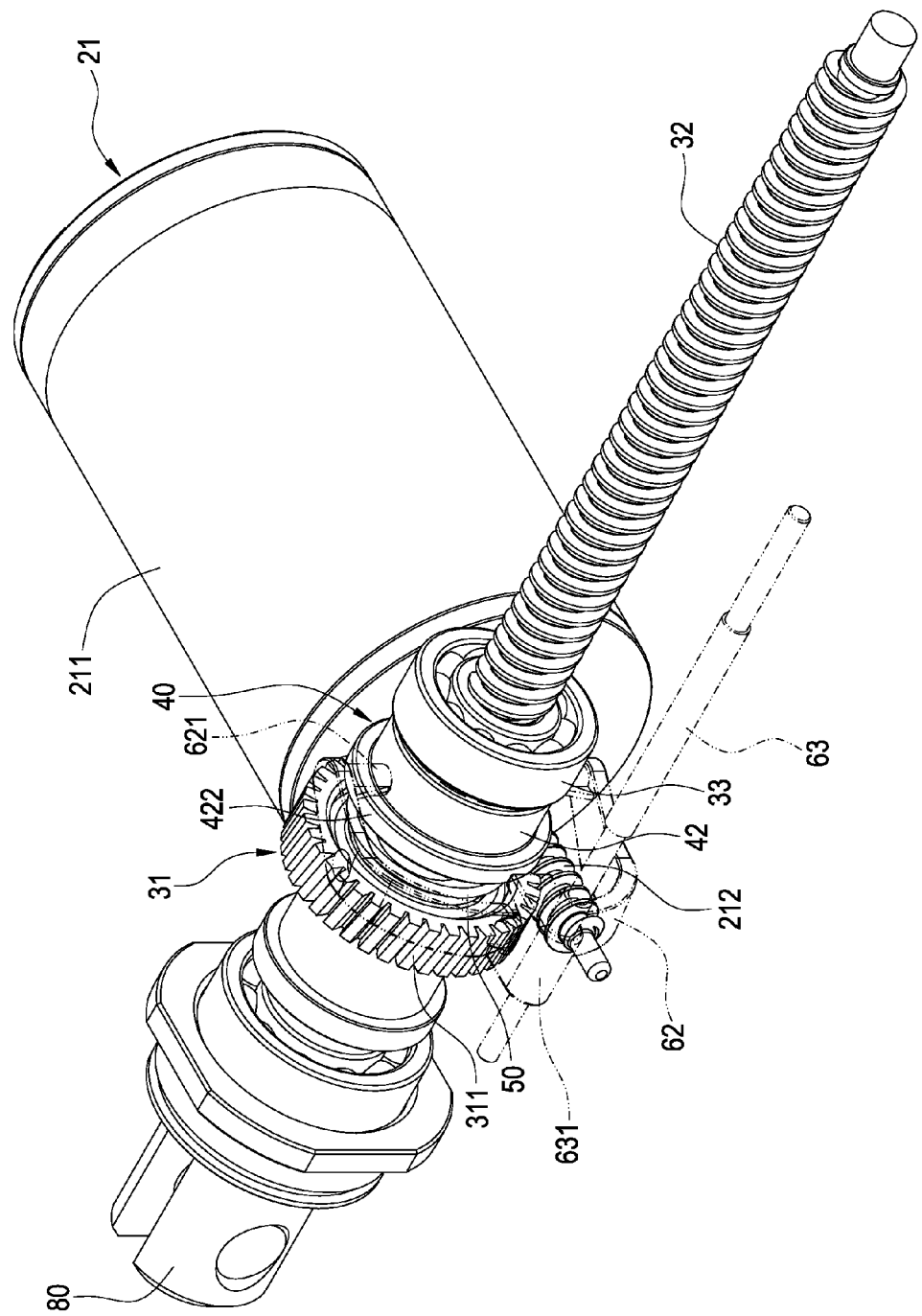
FIG. 6 is an illustration showing the outer appearance of the dialing mechanism prior to its actuation of the present invention.
Figure 7:
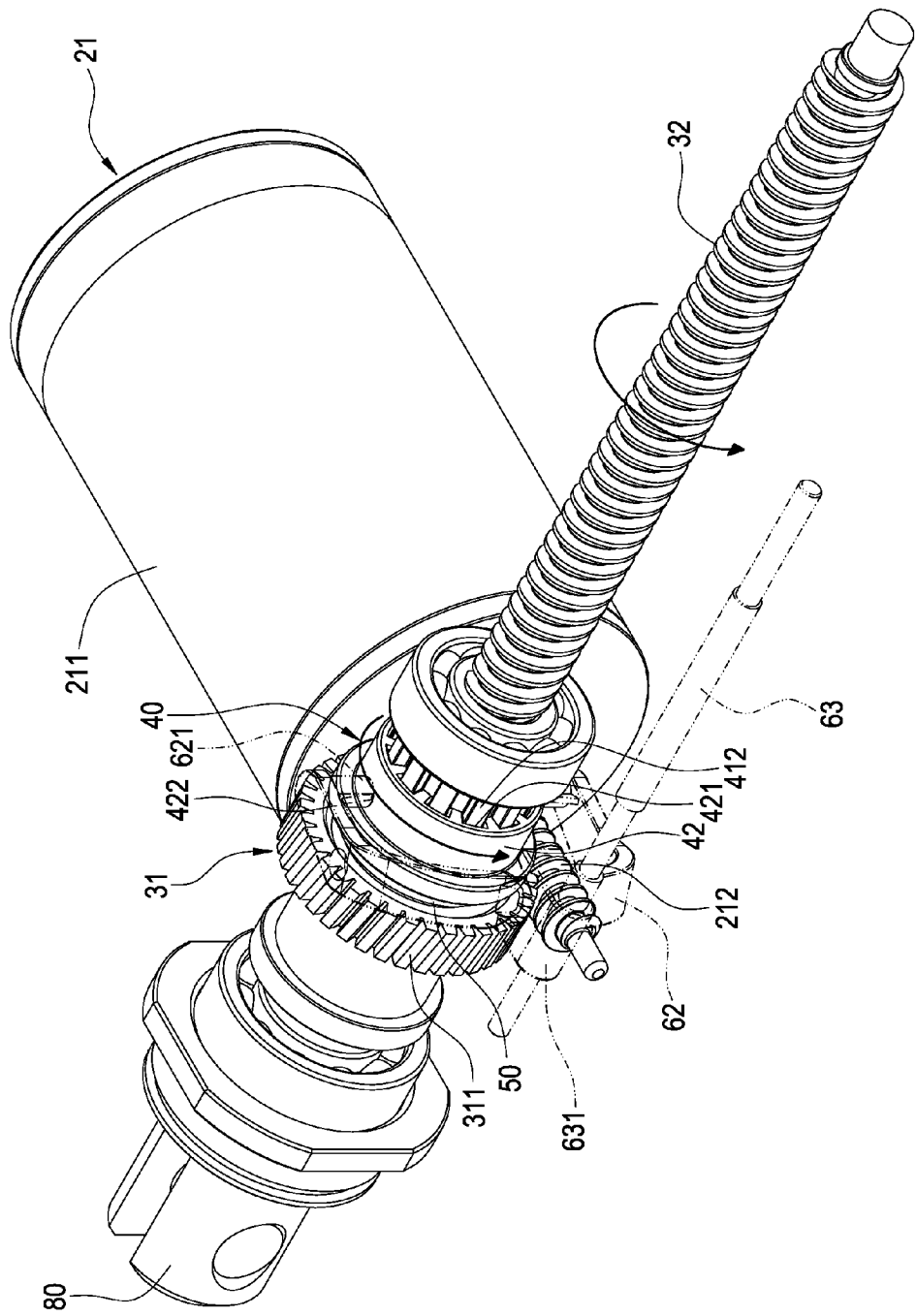
FIG. 7 is an illustration showing the outer appearance of the dialing mechanism after its actuation of the present invention.
Figure 8:
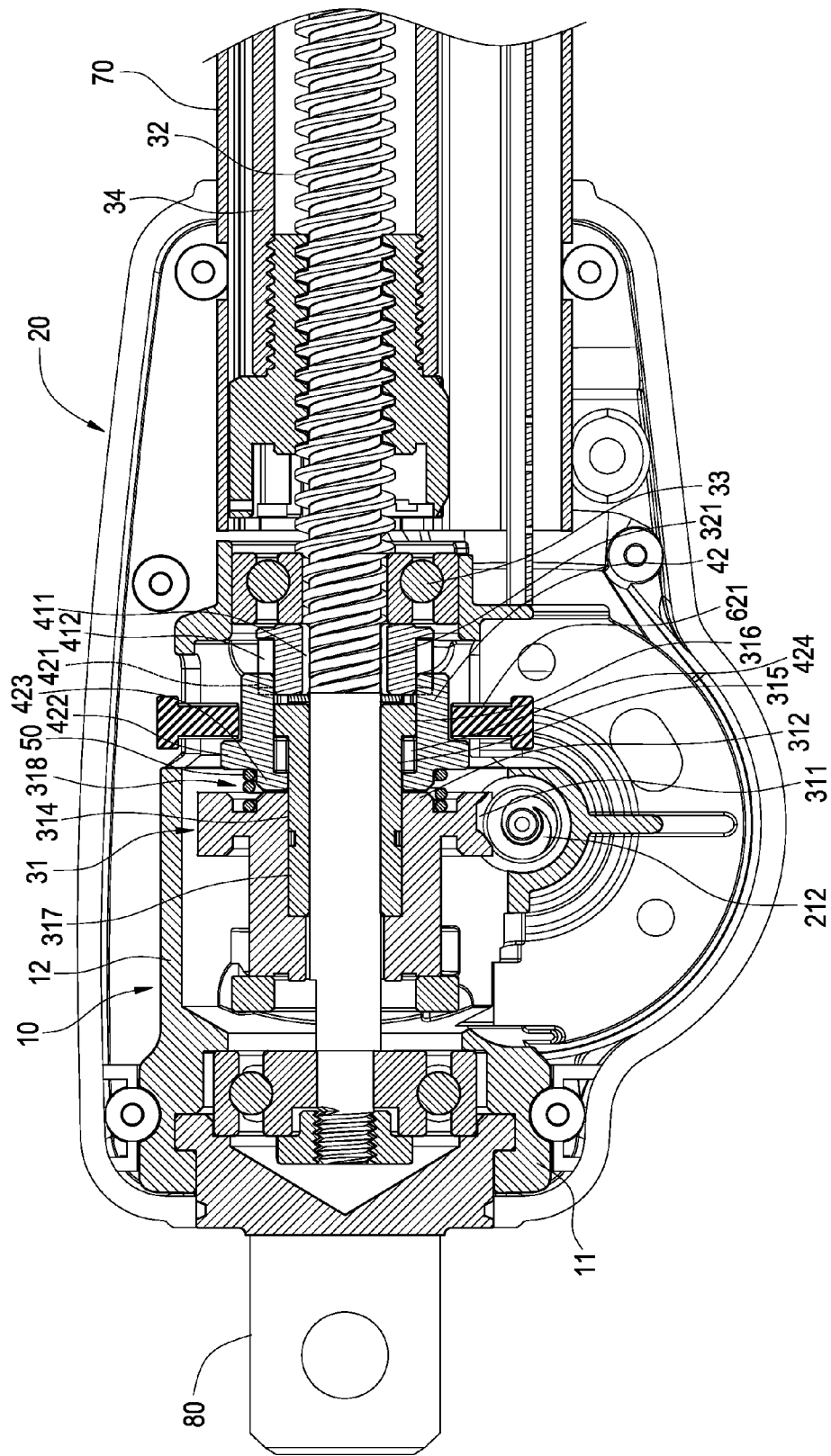
FIG. 8 is cross sectional view of the present invention in FIG. 7.

FIG. 6 is an illustration showing the pulling rod 63 prior to its actuation. Please refer further to FIG. 7. As shown in the figure, when the pulling rod 63 is moved in a direction away from the rear support 80 during the operation thereof, the hook portion 631 of the pulling rod 63 causes the rotating piece 62 to rotate. The rotating piece 62 would then rotate with the rotation center being pivotally attached to the screw studs 111, 121 to cause the dial arms 621 to push the blocking ring 422 of the second cylinder 42 in order to cause the second cylinder 42 to move in a direction toward the worm gear 311. During which, each one of the protruding teeth 316 of the axial sleeve 315 would then disengage from each one of the teeth slots 424 for the torque transmission. Following which, the extendable pipe 34 is compressed to cause the lead screw shaft 32 to generate a self-rotation. During the self-rotation of the lead screw shaft 32, the first cylinder 41 and the second cylinder 42 would also rotate altogether while the worm gear 311 and the axial sleeve 315 remain stationary without movements. As shown in FIG. 8, the area with the teeth slots 424 of the second cylinder 42 is able to rotate freely in the separation space provided between the supporting portion 312 and the protruding teeth 316.

In view of the above, the actuator with a quick-release mechanism of the present invention is able to achieve the expected operation objectives and to overcome the shortcomings of the known arts while being novel and of inventive step, which is too fully complied with the patentability requirements.

What is claimed is:

1. An actuator with a quick-release mechanism, comprising:
   a base (10);
   an electric motor (20) attached to the base (10) and comprising a worm shaft (212);
   a transmission mechanism (30) attached to the base (10) and comprising a worm gear assembly (31), a lead screw shaft (32) and a bearing (33); wherein the worm gear assembly (31) comprises a worm gear (311) driven by the worm shaft (212) and an axial sleeve (315) integrally formed on the worm gear (311) to be rotated therewith; the axial sleeve (315) is formed with a plurality of protruding teeth (316) at an end thereof away from the worm gear (311), and a diameter of the protruding teeth (316) is larger than that of the axial sleeve (315); and the lead screw shaft (32) penetrates through the worm gear assembly (31) and is supported on the base (10) via the bearing (33);
   a quick-release mechanism (40) mounted onto the lead screw shaft (32) and formed on a lateral side of the worm gear assembly (31) and comprising a first cylinder (41) fixedly attached to the lead screw shaft (32) and an axially moveable second cylinder (42) attached to the first cylinder (41); wherein the second cylinder (42) comprises a plurality of teeth slots (424) to engage with or disengage from the plurality of teeth (316) for an engaging transmission or a disengaging transmission; respectively;
   an elastic member (50) elastically clamped between the worm gear assembly (31) and the second cylinder (42); and
   a dialing mechanism (60) comprising a rotating piece (62) pivotally attached to the base (10); wherein the rotating piece (62) comprises a dial arm (621) for pushing away the second cylinder (42) to disengage from transmitting a torque of the worm gear assembly (31).

2. The actuator with a quick-release mechanism according to claim 1, wherein the base (10) comprises a lower base part (11) and an upper base part (12) closed correspondingly onto the lower base part (11); the lower base part (11) and the upper base part (12) comprise a pair of corresponding screw studs (111, 121) formed on an external thereof; the rotating piece (62) is of a U shape; the dial arm (621) is formed on an opening end of the rotating piece (62); the rotating piece (62) is pivotally attached to each one of the screw studs (111, 121) via a screw bolt.

3. The actuator with a quick-release mechanism according to claim 2, wherein the electric motor (20) comprises a main body (21) and an electric motor housing (22) for receiving the main body (21) therein; the main body (21) comprises an electric unit (211); the worm shaft (212) extends outward from a center of the electric unit (211); the electric motor housing (22) is attached to the base (10).

4. The actuator with a quick-release mechanism according to claim 3, wherein the dialing mechanism (60) further comprises a cover (61); the cover (61) closes onto the electric motor housing (22) correspondingly and covers the base (10).

5. The actuator with a quick-release mechanism according to claim 4, wherein the dialing mechanism (60) further comprises a pulling rod (63); the cover (61) comprises an axial hole (611); the pulling rod (63) penetrates through the axial hole (611) and is supported on the cover (61) via two bearing seats (612); the pulling rod (63) arranged between the two bearing seats (612) is attached to a hook portion (631); the hook portion (631) is attached to a closed end of the rotating piece (62) correspondingly.

6. The actuator with a quick-release mechanism according to claim 1, wherein the worm gear assembly (31) comprises a circular supporting portion (312) extended outward from an end surface facing toward the quick-release mechanism (40); the second cylinder (42) comprises a protruding ring (423) extended from an end surface thereof; the elastic member (50) is a torsion compression spring; two ends of the torsion compression spring are sleeved onto the protruding ring (423) and the circular supporting portion (312) respectively.

7. The actuator with a quick-release mechanism according to claim 1, wherein the transmission mechanism (30) further comprises an extendable pipe (34) to be engaged with and driven by the lead screw shaft (32), and the lead screw shaft (32) is a non-self-locking lead screw shaft.

8. The actuator with a quick-release mechanism according to claim 1, wherein the lead screw shaft (32) further comprises a positioning section (321); the first cylinder (41) comprises a positioning hole (411); the first cylinder (41) is fixedly mounted onto the positioning section (321) of the lead screw shaft (32) via the positioning hole (411).

9. The actuator with a quick-release mechanism according to claim 1, wherein the first cylinder (41) comprises a plurality of rotation-stop teeth (412) formed on a circumferential surface thereof and spaced apart from each other; the second cylinder (42) comprises a plurality of slots (421) formed thereon to be engaged correspondingly with the plurality of rotation-stop teeth (412).

10. The actuator with a quick-release mechanism according to claim 1, wherein the second cylinder (42) comprises a blocking ring (422) formed on an end portion away from the first cylinder (41); the rotating piece (62) is actuated via the dial arm (621) corresponding to the blocking ring (422).

11. An actuator with a quick-release mechanism, comprising:
   a base (10);
   an electric motor (20) attached to the base (10) and comprising a worm shaft (212);
   a transmission mechanism (30) attached to the base (10) and comprising a worm gear assembly (31), a lead screw shaft (32) and a bearing (33); wherein the worm gear assembly (31) comprises a worm gear (311) driven by the worm shaft (212) and an axial sleeve (315) removably attached to the worm gear (311) to be rotated therewith; the axial sleeve (315) is formed with a plurality of protruding teeth (316) at an end thereof away from the worm gear (311) and a plurality of protrusion strips (317) at another end thereof, the plurality of protrusion strips (317) are arranged circumferentially on the axial sleeve (315) adjacent to the worm gear (311), and a diameter of the protruding teeth (316) is larger than that of the protrusion strips (317) and the axial sleeve (315); and the lead screw shaft (32) penetrates through the worm gear assembly (31) and is supported on the base (10) via the bearing (33);

a quick-release mechanism (40) mounted onto the lead screw shaft (32) and formed on a lateral side of the worm gear assembly (31) and comprising a first cylinder (41) fixedly attached to the lead screw shaft (32) and an axially moveable second cylinder (42) attached to the first cylinder (41); wherein the second cylinder (42) comprises a plurality of teeth slots (424) to engage with or disengage from the plurality of teeth (316) for an engaging transmission or a disengaging transmission, respectively;

an elastic member (50) elastically clamped between the worm gear (311) and the second cylinder (42); and a dialing mechanism (60) comprising a rotating piece (62) pivotally attached to the base (10); wherein the rotating piece (62) comprises a dial arm (621) for pushing away the second cylinder (42) to disengage from transmitting a torque of the axial sleeve (315).

12. The actuator with a quick-release mechanism according to claim 11, wherein the base (10) comprises a lower base part (11) and an upper base part (12) closed correspondingly onto the lower base part (11); the lower base part (11) and the upper base part (12) comprise a pair of corresponding screw studs (111, 121) formed on an external thereof; the rotating piece (62) is of a U shape; the dial arm (621) is formed on an opening end of the rotating piece (62); the rotating piece (62) is pivotally attached to each one of the screw studs (111, 121) via a screw bolt.

13. The actuator with a quick-release mechanism according to claim 12, wherein the electric motor (20) comprises a main body (21) and an electric motor housing (22) for receiving the main body (21) therein; the main body (21) comprises an electric unit (211); the worm shaft (212) extends outward from a center of the electric unit (211); the electric motor housing (22) is attached to the base (10).

14. The actuator with a quick-release mechanism according to claim 13, wherein the dialing mechanism (60) further comprises a cover (61); the cover (61) closes onto the electric motor housing (22) correspondingly and covers the base (10).

15. The actuator with a quick-release mechanism according to claim 14, wherein the dialing mechanism (60) further comprises a pulling rod (63); the cover (61) comprises an axial hole (611); the pulling rod (63) penetrates through the axial hole (611) and is supported on the cover (61) via two bearing seats (612); the pulling rod (63) arranged between the two bearing seats (612) is attached to a hook portion (631); the hook portion (631) is attached to a closed end of the rotating piece (62) correspondingly.

16. The actuator with a quick-release mechanism according to claim 11, wherein the worm gear (311) comprises a supporting portion (312) extended outward from an end surface facing toward the quick-release mechanism (40); the second cylinder (42) comprises a protruding ring (423) extended from an end surface thereof; the elastic member (50) is a torsion compression spring; two ends of the torsion compression spring are sleeved onto the protruding ring (423) and the supporting portion (312) respectively.

17. The actuator with a quick-release mechanism according to claim 16, wherein the supporting portion (312) further comprises a through hole (313) at a center thereof; an inner wall of the through hole (313) comprises a plurality of grooves (314) arranged circumferentially thereon; each one of the protrusion strips (317) of the axial sleeve (315) sleeves onto and is fixedly engaged with each one of the grooves (314) of the worm gear (311); and a separation space (318) is formed between the supporting portion (312) and the protruding teeth (316) and is provided to accommodate the second cylinder (42) to rotate freely therein.

18. The actuator with a quick-release mechanism according to claim 11, wherein the transmission mechanism (30) further comprises an extendable pipe (34) to be engaged with and driven by the lead screw shaft (32), and the lead screw shaft (32) is a non-self-locking lead screw shaft.

19. The actuator with a quick-release mechanism according to claim 11, wherein the lead screw shaft (32) further comprises a positioning section (321); the first cylinder (41) comprises a positioning hole (411); the first cylinder (41) is fixedly mounted onto the positioning section (321) of the lead screw shaft (32) via the positioning hole (411).

20. The actuator with a quick-release mechanism according to claim 11, wherein the first cylinder (41) comprises a plurality of rotation-stop teeth (412) formed on a circumferential surface thereof and spaced apart from each other; the second cylinder (42) comprises a plurality of slots (421) formed thereon to be engaged correspondingly with the plurality of rotation-stop teeth (412); the second cylinder (42) comprises a blocking ring (422) formed on an end portion away from the first cylinder (41); the rotating piece (62) is actuated via the dial arm (621) corresponding to the blocking ring (422).

\* \* \* \* \*